(12) United States Patent
Huber, Jr.

(10) Patent No.: US 6,650,269 B1
(45) Date of Patent: *Nov. 18, 2003

(54) RAM AIR INFLATED PASSIVE RADAR DECOY AND CHAFF PACKAGE THEREFOR

(75) Inventor: Joseph C. Huber, Jr., Cuyahoga Falls, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 06/378,313

(22) Filed: May 14, 1982

(51) Int. Cl.[7] ................................................. G01S 7/38
(52) U.S. Cl. ........................... 342/12; 342/13; 342/14
(58) Field of Search ............................ 343/18 B, 18 C, 343/18 E; 342/5, 8, 9, 10, 12, 13, 14

(56) References Cited

U.S. PATENT DOCUMENTS

| | | | | |
|---|---|---|---|---|
| 3,104,612 A | * | 9/1963 | Knacke et al. | 343/18 B X |
| 3,160,879 A | * | 12/1964 | Downing et al. | 342/56 |
| 3,530,469 A | * | 9/1970 | Dalley et al. | 342/10 |
| 3,727,229 A | * | 4/1973 | Clinger et al. | 343/706 |
| 4,307,665 A | * | 12/1981 | Block et al. | 102/505 |
| 5,049,883 A | * | 9/1991 | Woodward | 342/12 |

* cited by examiner

*Primary Examiner*—John B. Sotomayor
(74) *Attorney, Agent, or Firm*—Renner, Kenner, Greive, Bobak, Taylor & Weber

(57) ABSTRACT

A passive radar decoy for deployment from an aircraft in flight comprises a substantially hemispherical body having its inner surface coated with an RF reflective material and its forward end connected to a weighted nose piece. The decoy is ram-air inflatable and is packaged with a plurality of chaff in the aircraft within a radar countermeasures ejection tube. Upon ejection from the aircraft, the decoy achieves RF coverage at millimeter wave frequencies and improves chaff dispersion and an increased period of doppler frequency return to a ground-based radar. The decoy may also include a second hemispherical body mounted at the approximate focus within the inflatable body and having its outer surface RF reflective so as to retroreflectively return RF energy impinging on the decoy and the combined returns from the decoy provide a scintillating signal return to the ground-based radar.

10 Claims, 3 Drawing Sheets

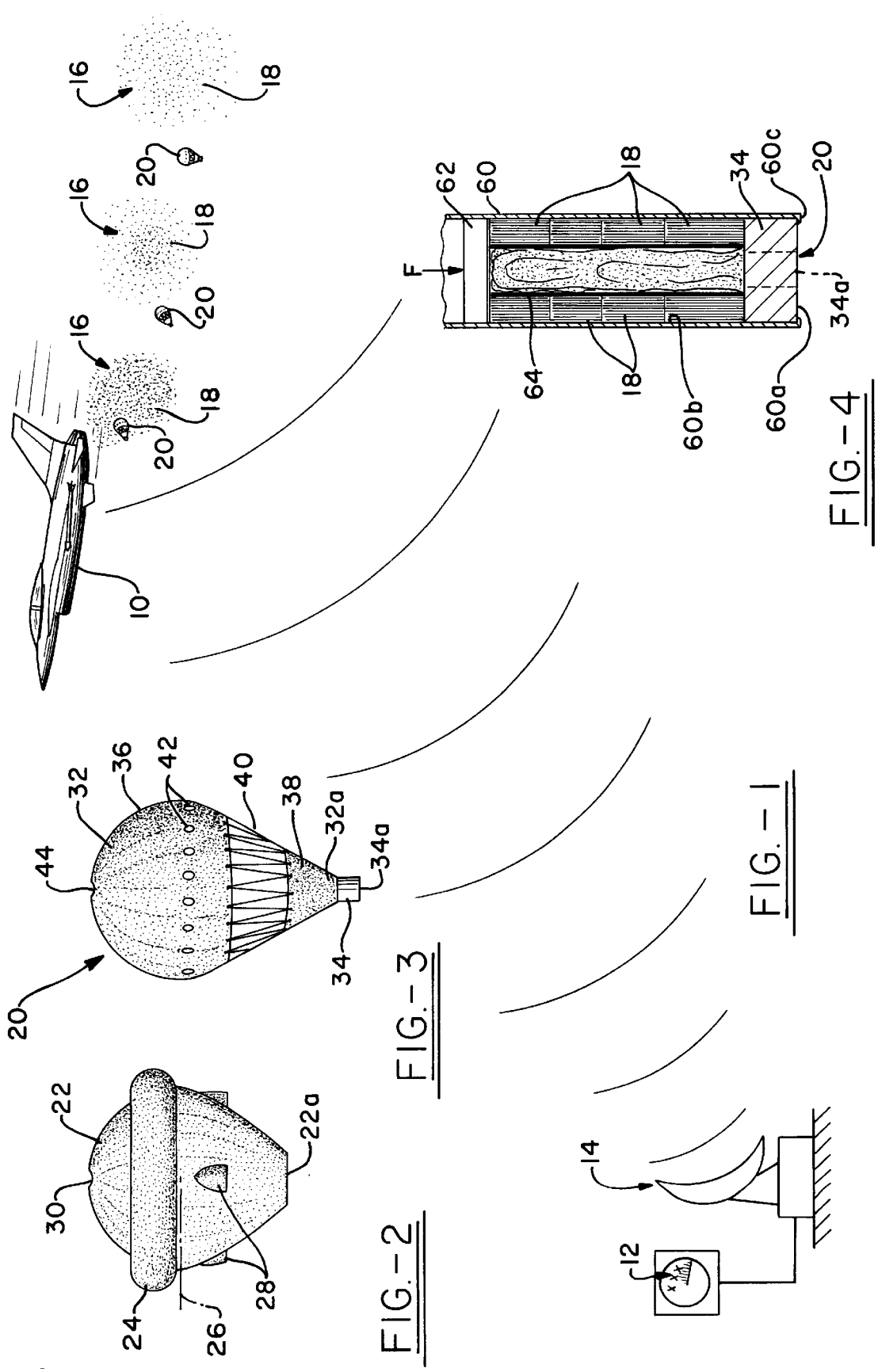

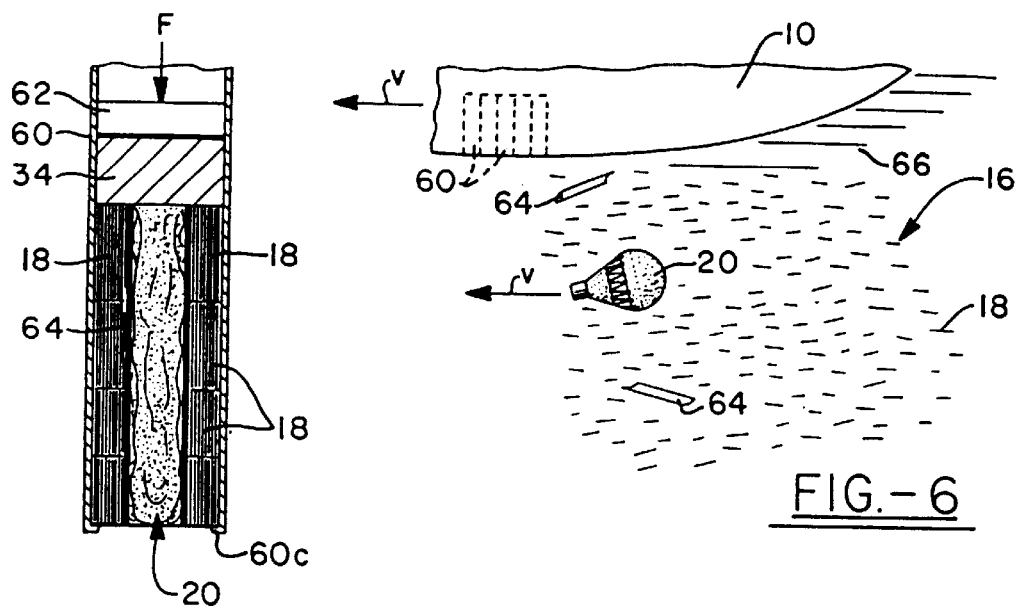
FIG.-5
FIG.-6
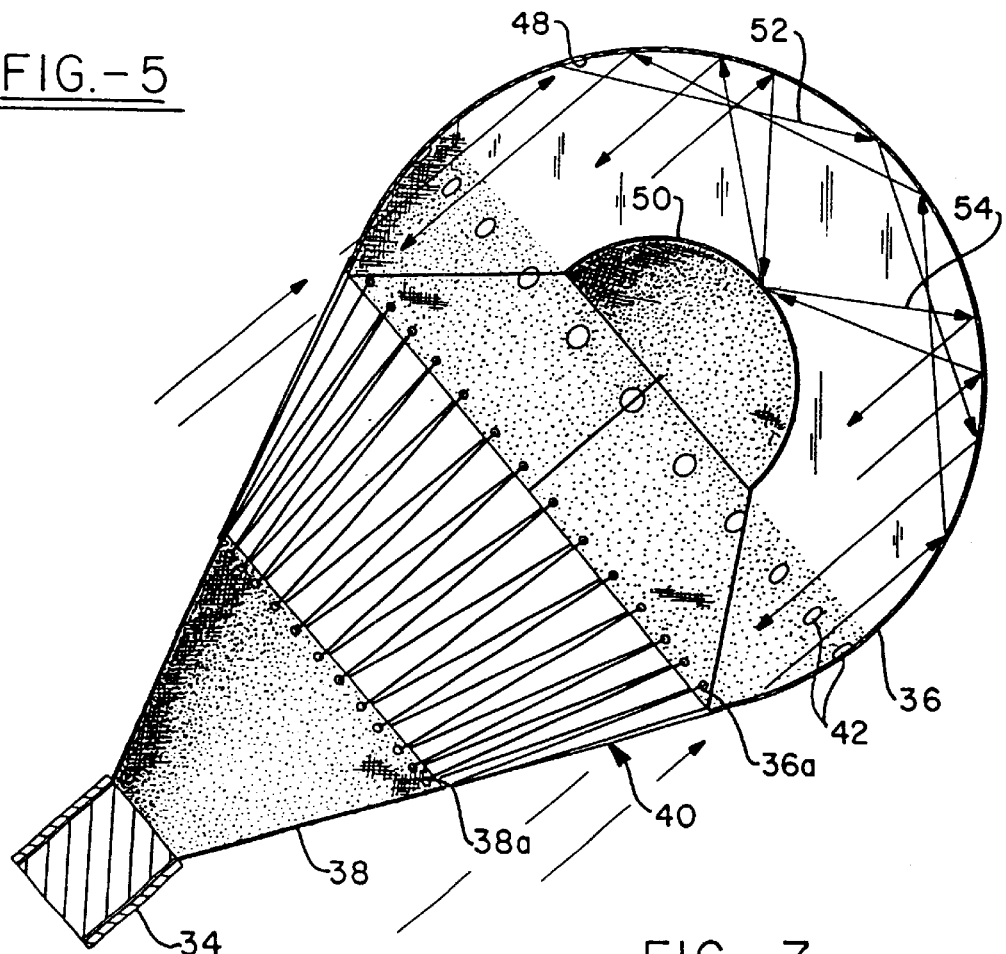
FIG.-7

RAM AIR INFLATED PASSIVE RADAR DECOY AND CHAFF PACKAGE THEREFOR

BACKGROUND OF THE INVENTION

This invention generally relates to passive radar decoys and more particularly to a self-inflated aerodynamic body incorporating a unique RF retroreflective configuration for radar target enhancement and a packaged body concept for rapid chaff deployment and improved radar cross section.

The use of chaff to defeat the radar function by denying it range and direction (azimuth and elevation) information is a well known and practiced technique in the art of radar jamming and/or countermeasures. Passive chaff elements in the form of discrete dipoles are dispensed by an aircraft to form a distinct cloud which creates a credible false target to the ground-based radar. The dipoles are generally low mass slivers of metallized milar, glass or other suitable dialectric material and these are very compactly and densely packaged into canisters and loaded into ejection equipment aboard the aircraft. The ejection equipment fire the chaff out of the canisters into the aircraft windstream where vehicle-induced turbulence or wind shear effects are available for cloud dispersion. The low mass chaff slivers, upon ejection, rapidly slow down and fall at an almost constant rate. For example, a widely used one mil metallized glass chaff has a settling rate of about 50 feet per minute.

One of the problems with present chaff systems is that the low mass slivers are easily damaged by the high compressive force necessary to eject them from the canister and into the aircraft windstream. Being compressed, the chaff dipoles may not uniformly disperse in the windstream and will therefor not provide the desired radar countermeasures performance.

Another problem with present chaff systems is the fact that the low mass slivers rapidly slow down upon ejection and therefor the useful life is shortened for lack of a doppler frequency return to the radar. The radar can therefore update its return information and easily determine the location of the aircraft because of its doppler velocity.

It is therefor in accordance with one aspect of the present invention, an object to provide a highly effective false target for enhancement of radar target cross section while requiring fewer numbers of packaged chaff elements.

It is in accordance with another aspect of the invention, an object to provide a self-inflated, passive radar decoy that achieves coverage at millimeter wave frequencies and improved chaff dispersion upon ejection from the aircraft and which provides an increased period of doppler frequency return to a ground-based radar.

In accordance with still another aspect of the invention, it is an object to provide a ram-air inflated passive decoy that has a unique RF retroreflective configuration for millimeter wave radar target performance.

The various aspects and advantages of the invention are met in a passive radar decoy comprising a substantially hemispherical upper body portion having an inner surface coated with an RF reflective material; a weighted nose piece; a tapered lower body portion interconnecting the upper body to the nose piece; and means to ram-air inflate the decoy when it is released from the aircraft such that RF energy impinging on the hemispherical upper body is reflected back to the source of RF energy.

Other aspects and advantages of the invention are met in a configuration for a radar countermeasures package for deployment from an aircraft in flight having a radar countermeasures system including an ejection tube having a force driven piston therein to effect expulsion of the contents of the tube into the atmosphere in response to a radar countermeasures requirement comprising a segmented tube mounted coaxially within the ejection tube; a passive radar decoy having a weighted nose piece and a ram-air inflatable body, the inner surface of the body coated with an RF reflective material and said inflatable body packaged within the segmented tube; and a plurality of chaff dipoles positioned within the ejection tube between it and the segmented tube, said segmented tube, passive decoy, and chaff dipoles being expelled from the ejection tube by the force-driven piston.

BRIEF DESCRIPTION OF THE DRAWINGS

FIG. 1 pictorially illustrates the application of the passive radar decoy and packaging concept which comprises the instant invention;

FIG. 2 is an elevational view of a passive decoy configuration that may be applied to this invention;

FIG. 3 is an elevational view of a preferred configuration for the passive decoy that meets the needs of the invention;

FIG. 4 is a sectional elevational view illustrating the packaged concept of the radar decoy and chaff elements as they may be stored onboard an aircraft;

FIG. 5 is a sectional elevational view similar to FIG. 4 illustrating an alternative packaging of the decoy and chaff elements;

FIG. 6 illustrates the method of chaff dispersion upon ejection of the decoy/chaff package illustrated in either of FIG. 4 or 5;

FIG. 7 is a sectional elevational view of the ram-air inflated decoy when in its operational configuration shortly after ejection from the aircraft;

DETAILED DESCRIPTION OF THE INVENTION

Figure 8:
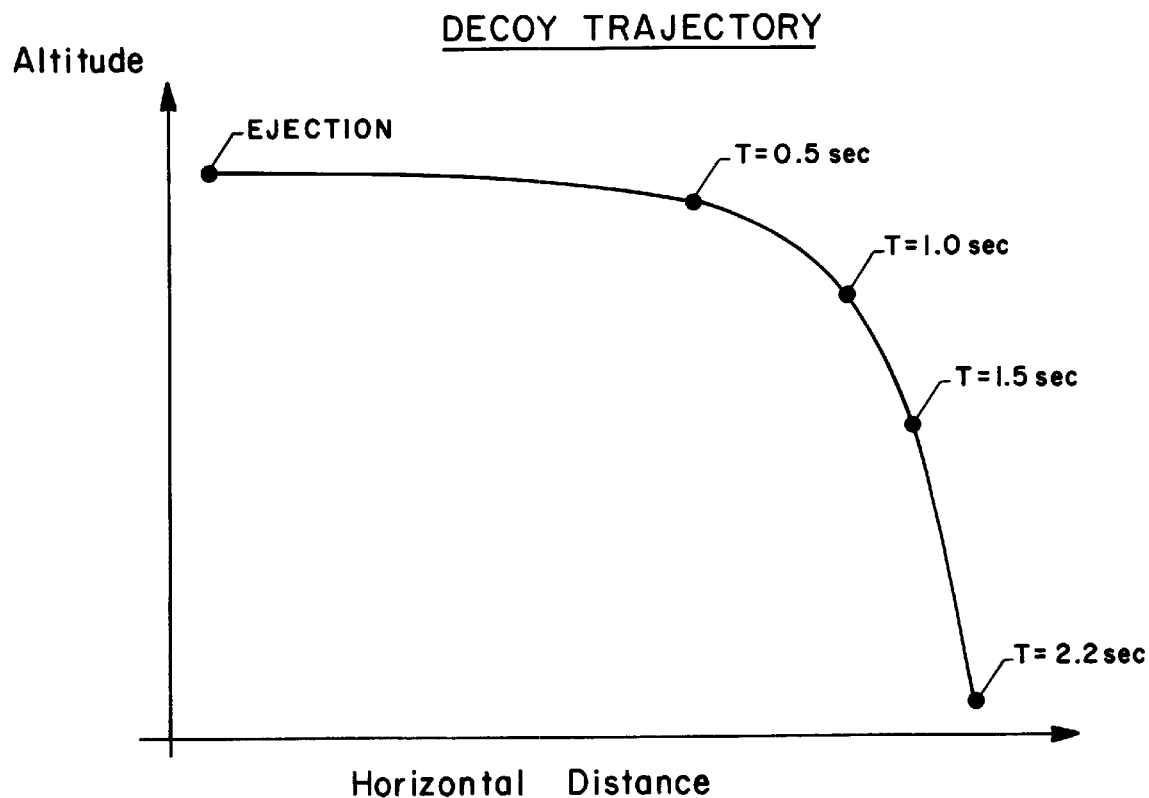
FIG. 8 is a graph of the decoy trajectory illustrating the useful period of the decoy.

Referring to the drawings, FIG. 1 illustrates a radar countermeasure technique as may be employed by an aircraft 10 flying over a hostile territory to create false targets 12 to an enemy radar 14 by dispensing chaff clouds generally indicated by reference numeral 16. Each chaff cloud 16 is comprised of thousands of small metallized dipoles 18 which in their dispensed configuration, effectively reflect radar energy to produce a target signal 12. In the usual practice, a plurality of clouds 16 may be created by the chaff dispensing aircraft 10 so as to provide a number of false targets 12 and thus saturate defense radar discrimination and computation capacity.

In accordance with this invention, the signal frequency performance of the chaff elements 18 may be dramatically increased by dispensing at least one passive decoy 20, which by reason of its high reflectivity to millimeter wave RF energy, enhances the radar target 12 as seen by the enemy radar 14. More specifically, the decoy 20 is an aerodynamic body of the BALLUTE™ type capable of ram-air inflation. A typical configuration of the BALLUTE is illustrated in FIG. 2 which shows the external appearance of these type devices. Most notable of the features are a substantially hemispherical main body 22, a burble fence 24 about the hemispherical portion and slightly above the equator 26 of the body, ram-air inlets 28, and a ram-air exit port 30. Similar type BALLUTES are being used as retarding devices for bombs and as safety lowering devices for equipment and the like and are usually attached at the tapered forward end 22a.

A preferred configuration for the decoy 20 is illustrated in FIG. 3 and FIG. 7 for application to this invention and it comprises a substantially hemispherical main body portion 32 that tapers to a forward end 32a having a weighted nose piece 34. The weighted nose piece 34 may include a ram-air inlet 34a and whether or not it includes such an inlet ™Goodyear Aerospace Corporation, Akron, Ohio will depend upon what provisions are made for ram-air inflation. For example, the decoy body 32 of the preferred embodiment is made in two parts, a substantially hemispherical main body portion 36 and a tapered lower body portion 38, the upper and lower portions being connected about their peripheral edges 36a, 38a by a plurality of cords generally indicated at 40. In this configuration the separation of the body portions 36,38 by the cords 40 allows for rapid ram-air entry into the body and inflation thereof immediately upon being ejected from the aircraft. While various other configurations of the BALLUTE body may be applied to this invention, the open body concept illustrated in FIGS. 3 and 7 may be packaged into a smaller storage space and further is found to ram-air inflate in the shortest time over other configurations using ram-air inlets 28 as shown in FIG. 2. In any case, the decoy 20 is provided with a plurality of ram-air exit holes 42 about the main body portion 36 that function to bleed off excessive ram air and thus stabilize the aerodynamic operation of the body. An additional ram-air exit hole 44 may be provided at the top of the hemisphere 36 in line with the body axis however test results indicate that such additional exit hole may only be necessary in a fully enclosed BALLUTE body of the type illustrated in FIG. 2.

The decoy body 20 comprised of portions 36,38 may be made from any of a number of well-known materials including fabrics and films which are able to be packaged in a minimum of space while also being capable of rapid inflation and strong enough to accept the force of ram-air upon ejection from the aircraft.

To continue, the decoy 20 has for its primary purpose the ability to reflect millimeter wave RF energy and in this respect the interior surface 48 of the hemispherical body portion 36 is coated with an appropriate RF reflective material. It will be appreciated by those knowledgeable in the art that the hemispherical body provides an ideal geometrical configuration for the return of the "glory rays" 52 of the incoming radar as illustrated in FIG. 7. In this respect, the diameter of the hemisphere 36 is chosen so as to cover the millimeter frequency range of the incoming radar to be reflected. For example, a 12-inch diameter hemisphere will reflect RF energy in the frequency range of 35 GHZ and again at about 95 GHZ. By mounting a second hemispherical body 50 concentrically within the first hemisphere 36 which is either partially or wholly reflective to the incoming RF energy and which is mounted at the approximate focus of the main body 36, the reflected RF will be directed retrodirectively back to the source 14 as illustrated in FIG. 7 by arrows 54. Thus, the interaction of the energy reflected on the inner hemisphere 50 and the glory rays produces the requisite scintilating chaff type radar return.

Referring now to FIGS. 4 and 5, the packaged configuration of the invention is illustrated. In FIG. 4 the decoy body 20 is shown as it may be packaged in a conventional chaff ejection cylinder 60 having a piston 62 at one end thereof for forceful ejection of the contents of the tube out of the opposite open end 60a. The decoy 20 is mounted within an inner tube 64 with the weighted end 34 positioned in the opening 60a of the tube 60 and held in place by extensions 60c within the tube bore 60b. As shown in the drawing, the smaller inner tube 64 abuts the piston 62 at the top end while also abutting the end of the decoy body weight 34 at the opposite end. Mounted between the outside of the inner tube 64 and the inside of the ejection tube 60 are the chaff dipoles 18 which are cut in various lengths to cover a specific range of RF frequencies. It will be appreciated that, in this configuration, the chaff dipoles 18 are protected from the compressive force F exerted, by the piston 62 through the tube 64. So as to provide rapid ram-air inflation of the decoy body, the tube 64 is installed in at least two semicircular sections that separate upon ejection from the tube 60. The sections will not only facilitate rapid inflation of the decoy body but will at the same time effect dispersal of the chaff dipoles 18 within the aircraft windstream 66 as illustrated in FIG. 6.

With reference to FIG. 5, the decoy body 20 is mounted in reverse order of that shown in FIG. 4 with the weight 34 adjacent the piston 62. In this configuration the compressive force F exerted by the piston 62 will be absorbed by the weight 34. The chaff dipoles 18 and tube 64 will therefore move out of the ejection tube 60 ahead of the weight 34, the tube 64 preventing any compression of the chaff 18. Irrespective of its mounting arrangement within the ejection tube 60, the decoy 20 will reach its most advantageous orientation with respect to the search radar 14 almost immediately upon being ejected. At the time of ejection, the weight 34 is moving at substantially the same velocity and in the same direction as the aircraft 10 and ram-air inflation of the hemispherical portion 36 of the decoy body will provide a doppler frequency return signal to the radar 14 that is a credible false target to the radar. The trajectory of the decoy 20 is illustrated in FIG. 8 and because it is moving in the same direction as the aircraft it provides a doppler frequency for at least 0.5 seconds after ejection. Thereafter the trajectory falloff is quite sharp and its useful life from a practical standpoint is terminated. However, the useful life is sufficiently long to fool the radar and additional decoy/chaff packages may be ejected to continue to decoy the radar.

Figure 9:
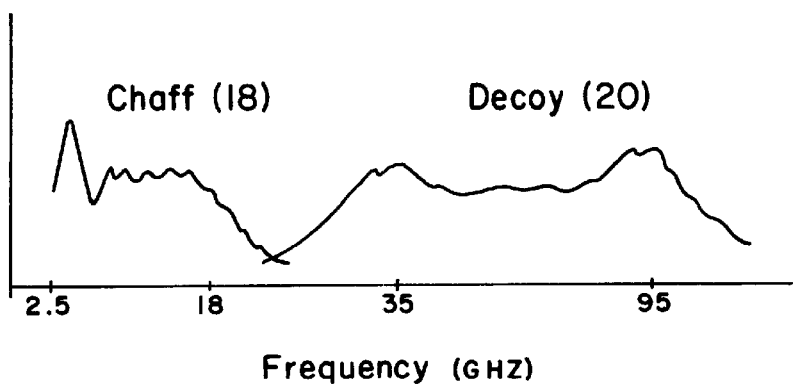
FIG. 9 graphically illustrates the radar target return which may be realized from the combined passive decoy-chaff configuration comprising the invention.

FIG. 9 illustrates the broad band coverage capable with the decoy/chaff combination when the decoy has a double concentric hemispherical configuration for retro-reflectivity as illustrated in FIG. 7. As shown, the coverage provided by the decoy begins at about 20 GHZ where the return from the chaff has ceased to be effective.

While certain representative embodiments and details have been shown for the purpose of illustrating the invention, it will be apparent to those skilled in this art that various changes and modifications may be made therein without departing from the spirit or scope of the invention.

What is claimed is:

1. A passive radar decoy for deployment from an aircraft in flight comprising:
   a substantially hemispherical upper body portion having a plurality of holes therethrough and an inner surface coated with an RF reflective material;
   a weighted nose piece; and
   a tapered lower body portion interconnecting the upper body to the nose piece by a plurality of cords forming a circumferential opening in the decoy that effects ram-air inflation of the decoy body when it is released from the aircraft, said holes in the upper body portion providing an exit for ram-air and stabilization of the decoy in flight such that RF energy impinging on the hemispherical upper body is reflected back to the source of RF energy.

2. The passive decoy as set forth in claim 1 wherein the upper hemispherical body portion has a diameter such as to effectively reflect RF energy at frequencies above 20 GHZ.

3. The passive decoy as set forth in claim 1 further including a second ram-air inflatable hemispherical body mounted within the upper body portion at the approximate focus of the body to retrodirectively reflect RF energy impinging on the decoy.

4. The passive decoy as set forth in claim 1 wherein the decoy comprises a plurality of side scoops positioned about the hemispherical upper body and a bore provided through the nose piece to direct ram-air into the decoy and inflate it upon release from the aircraft.

5. The passive decoy as set forth in either of claim 1 or 4 further including a burble fence positioned circumferentially about a diameter of the decoy to provide stabilization of the decoy in flight.

6. A passive radar decoy for deployment from an aircraft in flight comprising:
   a substantially hemispherical upper body portion having an inner surface coated with an RF reflective material;
   a weighted nose piece;
   a tapered lower body portion connected to the weighted nose piece;
   a plurality of cords interconnecting the tapered lower body portion to the upper hemispherical body portion to provide a circumferential opening into the decoy that effects ram-air inflation of the decoy; and
   a second smaller hemispherical body mounted within the upper body portion at the approximate focus of the upper body; said second hemispherical body having its outer surface coated with an RF reflective material;
   said decoy capable of reflectively returning RF energy at a particular GHZ frequency range by reason of the hemispherical upper body portion and retroreflectively returning RF energy at the same frequency by reason of the second hemispherical body to effect a scintilating signal by reason of the phase difference between the returns.

7. A configuration for a radar countermeasures package for deployment from an aircraft in flight having a radar countermeasures system including an ejection tube having a force driven piston therein to effect expulsion of the contents of the ejection tube into the atmosphere in response to a radar countermeasures requirement comprising in combination:
   a segmented tube mounted coaxially within the ejection tube;
   a passive radar decoy having a weighted nose piece and a ram-air inflatable body, the inner surface of the body coated with an RF reflective material, said inflatable body packaged within the segmented tube; and
   a plurality of chaff dipoles positioned within the ejection tube, between it and the segmented tube; said segmented tube, passive decoy, and chaff dipoles being expelled from the ejection tube by the force-driven piston.

8. The countermeasures package as set forth in claim 7 wherein the weighted nose piece of the decoy has a diameter substantially that of the bore of the ejection tube and is positioned in the tube at the end opposite the piston and said segmented tube has a length such that it abuts the nose piece at one end and abuts the piston at the opposite end such that the force which drives the piston is imparted to the segmented tube and nose piece and not to the chaff upon forceful expulsion of the package from the ejection tube.

9. The countermeasures package as set forth in claim 7 wherein the weighted nose piece of the decoy has a diameter substantially that of the bore of the ejection tube and is positioned in the tube adjacent the piston and said segmented tube is positioned to abut the nose piece such that the force which drives the piston is imparted to the nose piece and segmented tube and not to the chaff upon expulsion thereof from the ejection tube.

10. The countermeasures package as set forth in either of claim 8 or 9 wherein the ram-air inflatable body of the decoy has a substantially hemispherical main body portion and a second smaller diameter hemispherical body is mounted within the main body at the approximate focus thereof, said second body having an outer surface coated with an RF reflective material such that upon being ejected from the ejection tube the hemispherical bodies are inflated and reflectively return RF energy at a particular GHZ frequency range by reason of the hemispherical main body and retroreflectively return RF energy at the same frequency by reason the second hemispherical body to thus effect a scintilating signal return to a ground base radar by reason the phase difference between the RF energy returns.

* * * * *